United States Patent
Gahlert

(10) Patent No.: US 10,526,037 B2
(45) Date of Patent: Jan. 7, 2020

(54) THUMB SWITCH FOR OPERATING A MOBILE COMMUNICATION DEVICE AND/OR ELECTRICAL COMPONENTS AND A CONTROL SYSTEM OPERABLE VIA SUCH A THUMB SWITCH

(71) Applicant: Cobi.Bike GmbH, Frankfurt (DE)

(72) Inventor: Andreas Gahlert, Königstein (DE)

(73) Assignee: Cobi.Bike GMBH, Frankfurt (DE)

( * ) Notice: Subject to any disclaimer, the term of this patent is extended or adjusted under 35 U.S.C. 154(b) by 0 days.

(21) Appl. No.: 15/529,275

(22) PCT Filed: Nov. 27, 2015

(86) PCT No.: PCT/EP2015/077901
§ 371 (c)(1),
(2) Date: Jul. 20, 2017

(87) PCT Pub. No.: WO2016/083570
PCT Pub. Date: Jun. 2, 2016

(65) Prior Publication Data
US 2017/0361894 A1    Dec. 21, 2017

(30) Foreign Application Priority Data
Nov. 27, 2014 (DE) .................. 20 2014 105 749 U

(51) Int. Cl.
*B62K 23/02* (2006.01)
*G06F 3/033* (2013.01)
(Continued)

(52) U.S. Cl.
CPC .............. *B62K 23/02* (2013.01); *B62K 11/14* (2013.01); *B62K 21/26* (2013.01); *B62M 6/80* (2013.01);
(Continued)

(58) Field of Classification Search
CPC ........ B62K 23/02; B62K 11/14; B62K 21/26; B62M 6/80; B62J 2099/0026;
(Continued)

(56) References Cited

U.S. PATENT DOCUMENTS

| 2003/0135292 A1* | 7/2003 | Husgafvel ............. G06F 3/0219 700/83 |
| 2009/0076676 A1* | 3/2009 | Yamamoto .............. G06F 3/016 701/31.4 |

(Continued)

FOREIGN PATENT DOCUMENTS

| DE | 20 2012 012338 U1 | 3/2014 |
| EP | 2465758 A2 | 6/2012 |
| EP | 2 594 471 A1 | 5/2013 |
| WO | 2016/083570 A1 | 6/2016 |

OTHER PUBLICATIONS

European Patent Office, International Search Report for Application No. PCT/EP2015/077901, dated Feb. 22, 2016.
(Continued)

*Primary Examiner* — Stephen G Sherman
(74) *Attorney, Agent, or Firm* — Socal IP Law Group LLP; Nikki M. Dossman

(57) ABSTRACT

Disclosed is a thumb switch for operating a mobile communication device and/or electric components of a vehicle, said thumb switch comprising a housing, on which at least one operating element is arranged. In order to allow for ease of operation, the thumb switch has communication electronics for generating control signals for functions that can be carried out on the mobile communication device and/or on at least one electrical component of the vehicle. The invention further relates to control system comprising such a thumb switch.

14 Claims, 1 Drawing Sheet

(51) Int. Cl.
*B62K 11/14* (2006.01)
*B62K 21/26* (2006.01)
*B62M 6/80* (2010.01)
*H04M 1/725* (2006.01)
*B62J 99/00* (2009.01)
*H01H 9/06* (2006.01)

(52) U.S. Cl.
CPC ....... *G06F 3/033* (2013.01); *B62J 2099/0026* (2013.01); *H01H 2009/068* (2013.01); *H04M 1/7253* (2013.01); *H04M 1/72533* (2013.01)

(58) Field of Classification Search
CPC .......... H01H 2009/068; H04M 1/7253; H04M 1/72533; G06F 3/033; G06F 3/0338; G06F 3/0362
See application file for complete search history.

(56) References Cited

U.S. PATENT DOCUMENTS

| | | | |
|---|---|---|---|
| 2010/0097325 A1 | 4/2010 | Nagao et al. | |
| 2013/0113709 A1* | 5/2013 | Wine | G06F 1/163 345/169 |
| 2015/0054760 A1* | 2/2015 | Amaru | G02B 27/0101 345/173 |

OTHER PUBLICATIONS

European Patent Office, Written Opinion of the International Search Authority for Application No. PCT/EP2015/077901, dated Feb. 22, 2016.

European Patent Office, Examining Division Report for Application No. 15 801 427.4, dated Feb. 19, 2019.

\* cited by examiner

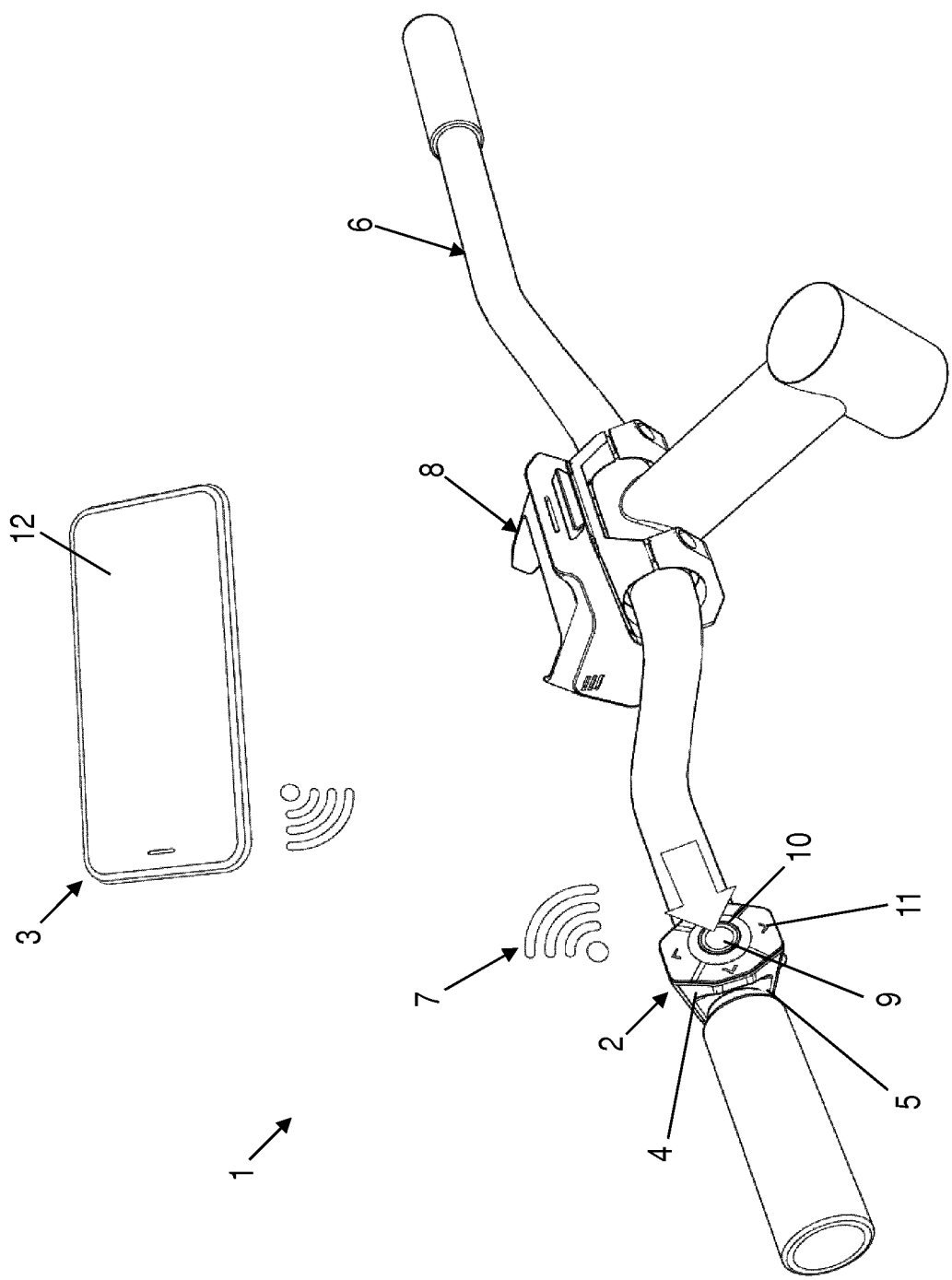

THUMB SWITCH FOR OPERATING A MOBILE COMMUNICATION DEVICE AND/OR ELECTRICAL COMPONENTS AND A CONTROL SYSTEM OPERABLE VIA SUCH A THUMB SWITCH

The invention relates to a thumb switch for operating a mobile communication device and/or electrical components of a vehicle according to the preamble of claim 1 and a control system that can be operated with such a thumb switch. In particular, the invention relates to a corresponding thumb switch for fixing to bicycle handlebars and a control system of a bicycle with such a thumb switch.

For controlling components of a vehicle, and particularly of a bicycle, such as of a gear system or of a suspension adjustment to suspension forks, thumb switches are known in the state of the art in various designs, whereby switches which may be operated with a finger other than the thumb are also to be understood as thumb switches in the sense of the invention. The particular advantage of this thumb switch is that control of the components is possible via the thumb switch without having to move the hand from the handlebars.

In a bicycle, the transfer of control signals normally occurs via cables. In newer systems, particular control signals are transferred electronically via a line connection, whereby generally a direct transfer occurs from the thumb switch to the electronic component of the bicycle. With these solutions, it is thus always necessary to have a wired connection between the thumb switch and the component of the bicycle. Should control of several components be desired, a relatively complicated system of cabling is necessary.

The task of invention is therefore to provide a thumb switch and a control system with which various control functions may be carried out without particular effort, also during a journey.

This task is solved by a thumb switch with the features of claim 1 as well as the control system with the features of claim 11. Preferred embodiments are subject of the dependent claims.

In a thumb switch for operating a mobile communication device and/or electrical components of a vehicle, in particular of a bicycle, with a housing on which at least one operation element is arranged, the invention provides that the thumb switch comprises communications electronics for producing control signals for functions that may be executed on the mobile communications device and/or at least of an electric component of the vehicle.

In preferred embodiments in a thumb switch for attaching to a steering device, in particular to bicycle handlebars, with a housing on which at least one operation element is arranged, the invention provides that the thumb switch comprises communications electronics for wireless transfer of control signals for controlling at least one electric component of the bicycle.

It is therefore not necessary that a wired connection exists between the thumb switch and the electric component or components of the bicycle, instead, communication occurs wirelessly, preferably by a transmission standard such as Bluetooth. Wireless communication can thereby directly emanate from the thumb switch or via a control unit connected with the thumb switch, for instance via a cable. The thumb switch thereby converts analog signals that may be input via the operation elements into digital control signals and transfers these directly or indirectly to, for example, a mobile communication device, such as a smartphone. In this way, functions and/or programs of the mobile communications device itself may be controlled via the thumb switch. Should the control signal not be directly wirelessly transferred from the thumb switch to the corresponding components of the bicycle, this can also occur indirectly, for example via the mobile communication device, whereby in the communication device processing of the control signals can also take place. Overall, the effort involved in controlling one or several components is kept low.

Preferably, the operation element is formed as a multi-option-switch. In this way, different functions can be effected with the same operation element without any problem. The operation element is preferably formed as a joystick, which may be moved in different directions.

Particularly preferred is that the operation element may be operated in at least four, in particular five, nine or ten operation directions. These can be, for example, the principle directions of movement up, down, right, left, as well as a depression, whereby directions lying between these directions as well as rotation of the operation elements are also possible. A variety of control possibilities are thereby conceivable.

In a preferred embodiment, a lit ring, for instance a sectionally lit ring, is arranged around the operation element, whereby adjustment symbols are arranged in particular on the housing radially outside of the ring. The ring, which in particular is formed as a recess, simulates possible movement spaces of the operation elements, whereby optional lighting simplifies operation in the dark. In this way, the lighting can light the ring, in particular sectionwise, so that for instance the most recent operation direction or the available operation directions can be shown. Through the arrangement of adjustment symbols on the housing, operation can be simplified.

Preferably the thumb switch comprises an electric energy storage. The thumb switch can thereby be operated self-sufficiently, whereby the electric energy necessary for operation is taken from the energy storage, which is in particular formed as a battery or a rechargeable energy storage.

To improve recognition in the dark, the thumb switch can comprise lighting, in particular for the operation element.

Ideally, the housing comprises an attachment clamp to simplify attaching the thumb switch to the bicycle handlebar. Other attachment possibilities are also conceivable, for example cable ties or an additional mount.

The previously described task of the invention is also solved by a control system with an inventive thumb switch, whereby the control system encompasses a mobile communication device with which the control signals of the thumb switch may be received and in particular transferred to at least one corresponding electrical component.

The mobile communication device, such as a mobile telephone or smartphone, comprises a display, by means of which a component to be controlled may be selected, for instance via the thumb switch, in order to subsequently generate control signals. Since the control signals are received from the communication device and transferred onwards from there, the mobile communication device serves as it were as a central control, which transfers the control signals received from the thumb switch to corresponding components.

Here it is particularly preferred that a display and/or function of the mobile communication device may be switched. The communication device can then itself constitute an electric component of the vehicle or bicycle. Through this, it is possible to select via the thumb switch whether a current speed, a map view or the like should be displayed by the communication device. Operation of the communication device can therefore also at least partially occur via the thumb switch and in this way, also take place during the journey without issue. The thumb switch thereby constitutes a hardware switch for controlling the functions of the mobile communication device, i.e. of programs or software.

In an advantageous embodiment, the control signals received from the thumb switch may be reviewed in the communication device and if necessary amended, for instance automatically. In this way a variety of different electric components are also controllable, whereby execution of the control signals occurs individually for the respective component in the communication device, which generally comprises a sufficient computing capacity and memory capacity therefor.

Further features, details and advantages of the invention arise from the wording of the claims as well as from the following description of embodiments with the aid of the FIGURE. This shows in schematic view:

FIG. 1 a control system for a vehicle with a thumb switch mounted onto bicycle handlebars in a spatial representation.

FIG. 1 shows a control system 1 for a vehicle, in particular for a bicycle, which comprises a thumb switch 2, a mobile communication device 3 as well as appropriate additional electronically controllable components of the vehicle, which are not shown further. The mobile communication device 3 can thereby itself constitute a component that may be controlled with the thumb switch 2, however also further actuators or sensors can be electronically controllable componence of the bicycle.

The thumb switch 2 comprises a housing 4 with an attachment clamp 5, with which the thumb switch 2 is attached to bicycle handlebars 6. Control signals 7 are wirelessly transferable from the thumb switch 2, in particular via Bluetooth, to the mobile communication device 3, whereby a mounting frame 8 is attached to the bicycle handlebars 6 for attaching the communication device 3.

A control unit may be arranged in the mounting frame 8, which is connected with the thumb switch in particular via a cable. Via the cable, the control signals 7 can be transferred to the control unit and from there wirelessly forwarded to the electronic components or the mobile communication device. However, it is also possible to supply the thumb switch 2 with electrical energy via the cable.

The thumb switch 2 comprises an operation element 9 in the form of a joystick, which is surrounded by a ring 10 in the form of a recess. Symbols 11, which show possible operation directions, are provided on the housing 4.

The operation element 9 can be moved in eight radial directions as well as pressed axially and turned in a circumferential direction, so that ten operation directions are given. In this way, for example an electrical component may be selected on a display 12 of the communication device 3 and subsequently a desired control signal may be produced. The thumb switch thereby converts analog switch commands to digital control signals, which are wirelessly transferred to the communication device 3.

The inventive control system offers the possibility of controlling the mobile communication device 3, such as a smart phone, with the thumb during a journey by means of the thumb switch 2, without having to take the hands away from the steering device. Such operation is also possible during the journey. The connection to the communication device is hereby wireless, so that operation via the thumb switch can also occur when the smartphone is located in a pocket, for instance. The system converts the analog switch commands into wireless control signals, which are processed by the communication device if necessary and are transfer directly wirelessly or via a further control unit, in order to control different electric components of the bicycle, such as actuators and sensors.

The invention is not restricted to one of the previously described embodiments, but may be developed in a variety of different ways. Wireless communications can in particular also occur by means of another transmission standard such as Bluetooth. The operation element and/or housing of the thumb switch can also have an alternative shape. With the aid of the inventive thumb switch, the operation of a mobile communication device is also possible during the journey and without haptic contact, whereby through this, further electric components of the vehicle, which receive their adjustment signals from the mobile communication device, are also made possible. Wireless control of the mobile communication device and thereby the programs saved on it can occur. Through this or also directly, it is also possible to control electric components of the vehicle by the thumb switch. In particular, a bidirectional transfer of the control signals occurs.

All features that arise from the claims, the description and the FIGURE, including constructional details, spatial arrangements and method steps can also be significant for the invention on their own as well as in various combinations.

The invention claimed is:

1. A thumb switch for operating a mobile communication device and electric components of a vehicle, with a housing, on which at least one operation element is arranged which may be operated in at least 4 operation directions, including operating radially, axially, and circumferentially, and a mounting geometry, which in particular is formed as an attachment clamp for attachment to a steering device, wherein the thumb switch comprises communications electronics for producing control signals for functions executable on the mobile communication device and at least one electric component of the vehicle.

2. The thumb switch of claim 1 characterized in that the control signals are transferable from the communications electronics directly wirelessly to the communication device and/or to the component.

3. The thumb switch according to claim 1, characterized in that the thumb switch is connected to a control unit, with which the control signals transferred from the thumb switch are wirelessly transferable to the communication device and/or the electric component.

4. The thumb switch according to claim 1, wherein the steering device is bicycle handlebars.

5. The thumb switch according to claim 1, characterized that the operation element is formed as a multi-way-switch.

6. The thumb switch according to claim 1, characterized in that the operation element may be operated in 5, 9 or 10 operation directions.

7. The thumb switch according to claim 1, characterized in that a particular sectionwise lighted ring is arranged around the operation element, whereby adjustment symbols are arranged on the housing radially outside of the ring.

8. The thumb switch according to claim 1, characterized in that the thumb switch further comprises an electric energy storage.

9. The thumb switch according to claim 1, characterized in that the thumb switch further comprises lighting, in particular for the operation element.

10. The thumb switch according to claim 1, characterized in that the housing comprises an attachment clamp.

11. A control system with a thumb switch according to claim 1, characterized in that the control system comprises a mobile communication device, with which the control signals of the thumb switch may be received and in particular transferred to at least one corresponding electric component of the vehicle.

12. A control system according to claim 11, characterized in that the control system further comprises a control unit, which in particular is connected with the thumb switch in a wired manner and provides wireless communication with the mobile communication device and/or the electric component.

13. A control system according to claim 11, characterized in that a display and/or functions of the mobile communication device are switchable via the thumb switch.

14. A control system according to claim 11, characterized in that the control signals received from the thumb switch are reviewable in the communication device and in particular are automatically amendable.

* * * * *